United States Patent [19]

Holmberg et al.

[11] Patent Number: 5,028,112
[45] Date of Patent: Jul. 2, 1991

[54] PRECISION MULTI-CHANNEL FIBER OPTIC INTERFACE AND METHOD

[75] Inventors: Gerald E. Holmberg, Quaker Hill; Roger L. Morency, Voluntown, both of Conn.

[73] Assignee: The United States of America as represented by the Secretary of the Navy, Washington, D.C.

[21] Appl. No.: 544,556

[22] Filed: Jun. 27, 1990

[51] Int. Cl.$^5$ .............................................. G02B 6/36
[52] U.S. Cl. ................................. 350/96.20; 350/320
[58] Field of Search .............. 350/96.20, 96.21, 96.22, 350/320; 219/69.11, 69.13, 69.15, 69.17

[56] References Cited

U.S. PATENT DOCUMENTS

| 000,542 | 11/1988 | Werkheiser, Jr. | 350/96.25 |
| 3,556,636 | 1/1971 | Roberts et al. | 350/96.24 |
| 3,754,882 | 8/1973 | Van Esdonk et al. | 350/96.27 X |
| 3,951,514 | 4/1976 | Medina, Jr. | 350/96.22 |
| 4,182,546 | 1/1980 | Lukas et al. | 350/96.21 |
| 4,341,439 | 7/1982 | Hodge | 350/96.22 |
| 4,405,200 | 9/1983 | Hoffmann et al. | 350/96.21 |
| 4,654,498 | 3/1987 | Sato | 219/69.15 |
| 4,753,510 | 6/1988 | Sezerman | 350/96.21 |

Primary Examiner—John D. Lee
Attorney, Agent, or Firm—Michael J. McGowan; Prithvi C. Lall

[57] ABSTRACT

Methods are disclosed for forming precision, fiber optic interfaces, and a precision, fiber optic interface is disclosed in accordance therewith, an electroformed disk is disclosed to provide fiber alignment, and electrical discharge machining (EDM) is disclosed to provide accurate angular alignment of optical fibers at a planar optical interface. In one method embodiment, a combination of EDM, an alignment bushing and an electroformed disk are used to fashion a precision multi-channel fiber optic interface, and in one interface and method embodiment, two electroformed disks are used to provide a precision, multi-channel fiber optic interface.

18 Claims, 3 Drawing Sheets

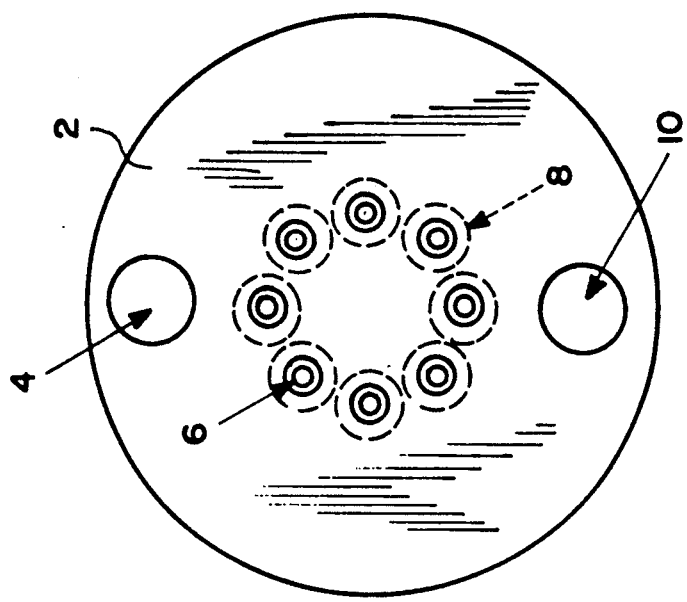
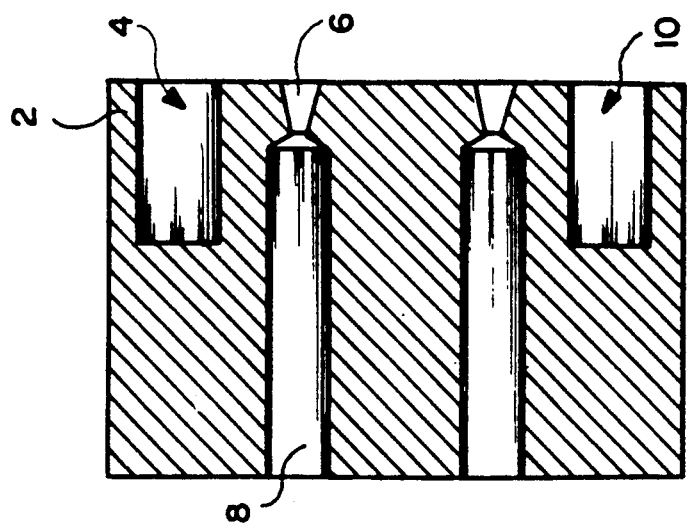
FIG. 1B
FIG. 1A

PRECISION MULTI-CHANNEL FIBER OPTIC INTERFACE AND METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention is directed to fiber optics, and more particularly, to a novel, precision multi-channel fiber optic interface and method.

(2) Description of the Prior Art

One technique has been developed through the prior art to align several multimode optical fibers across an interface. The technique involves the precision drilling of holes for the fibers into a precision alignment bushing. Fiber alignment across an interface is maintained by precision pins which are anchored in other precision holes in the alignment bushing. The optical fibers are polished flush with the surface of the alignment bushing. When two such planar interfaces are mated fiber-to-fiber alignment is accomplished by precision alignment pins that connect the alignment bushings. The optical fibers that have been used have a 140 $\mu$m outside diameter and a 100 $\mu$m core diameter. As will be appreciated by those skilled in the art, drilling holes for these fibers is a technical challenge. The holes must have a large length/diameter ratio to assure that light will not exit from the fiber face at an angle. Conventional drilling technology, however, does not provide a sufficient length/diameter ratio for accurate fiber alignment. For the multimode optical fibers with an outside diameter of 125 $\mu$m and a core diameter of 62.5 $\mu$m that are becoming a new Navy standard, a more accurate alignment technique and precision optical interface are required.

SUMMARY OF THE INVENTION

In accordance with one object of the instant invention, a more accurate method is disclosed that precisely positions optical fibers at an optical interface. In accordance with another of its objects, the present invention discloses a precision multi-channel fiber optic interface. In accordance therewith, an electroformed disk is disclosed to provide fiber alignment, and electrical discharge machining (EDM) is disclosed to provide accurate angular alignment of optical fibers at a planar optical interface. In one method embodiment, a combination of EDM, an alignment bushing and an electroformed disk are used to fashion a precision multi-channel fiber optic interface, and in one interface and method embodiment, two electroformed disks are used to provide a precision, multi-channel fiber optic interface.

BRIEF DESCRIPTION OF THE DRAWINGS

These and other objects, features and advantages of the present invention will become apparent to those skilled in the art upon reference to the following detailed description of the preferred embodiments, and to the drawings, wherein:

FIG. 1A is a side sectional view and FIG. 1B is an end view of a precision alignment bushing in accordance with the present invention;

DETAILED DESCRIPTION OF THE PREFERRED EMBODIMENTS

Referring now to FIG. 1 there is shown in FIG. 1A a side sectional view and in FIG. 1B an end view of a precision alignment bushing 2. The bushing 2 is made out of a metal, and preferably is drilled using both electrical discharge machining (EDM) and conventional drilling. The bushing 2 contains large holes 4 and 10, which preferably are drilled and jig-ground by the conventional machining techniques. A plurality of holes 6 for optical fibers preferably are drilled by EDM, since the holes 6, which have an outer diameter as small as 125 $\mu$m, are difficult to drill with sufficient length/diameter ratio using the conventional drilling technology. EDM, such as tubular EDM well-known to those skilled in the art, allows such small holes to be drilled with exemplary length/diameter ratios of 8/1, and typically results in a slightly larger diameter on the outside of the hole than on the inside, so that the hole is cone-shaped with a 1 or 2 degree taper at the surface of the interface, shown exaggerated for purposes of illustration. Holes 8 are counterbored preferably using conventional drilling techniques at the holes 6 from the rear of the alignment bushing 2, with a diameter to accept optical fiber coatings or jackets.

Figure 2:
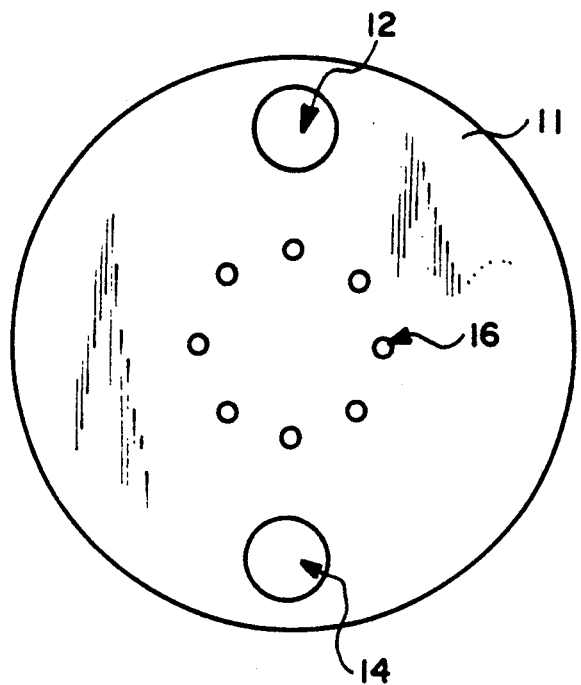
FIG. 2A is a side sectional view and FIG. 2B is an end view of a precision alignment disk in accordance with the present invention.
Figure 2:
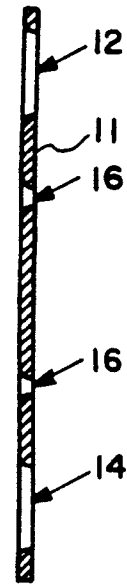

Referring now to FIG. 2, there is shown in FIG. 2A a side sectional view and in FIG. 2B an end view of a precision alignment disk 11. The disk 11 is preferably made using electroform technology, which, as will be appreciated by those skilled in the art, is a high accuracy, photolithographic technique, although any other suitable technique may be employed. The disk 11 is formed by electro-deposition of a metal, such as nickel, onto a precision mask. The disk preferably is a few thousandths of an inch thick and contains holes 12 and 14 for precision alignment pins, and a plurality of small holes 16 matching hole 6 of bushing 2 for optical fibers. As shown in FIG. 2A, the electroformed disk 11 has naturally rounded edges on one side of the holes 12, 14, 16, which is beneficial for inserting small fibers thereinto.

Figure 3:
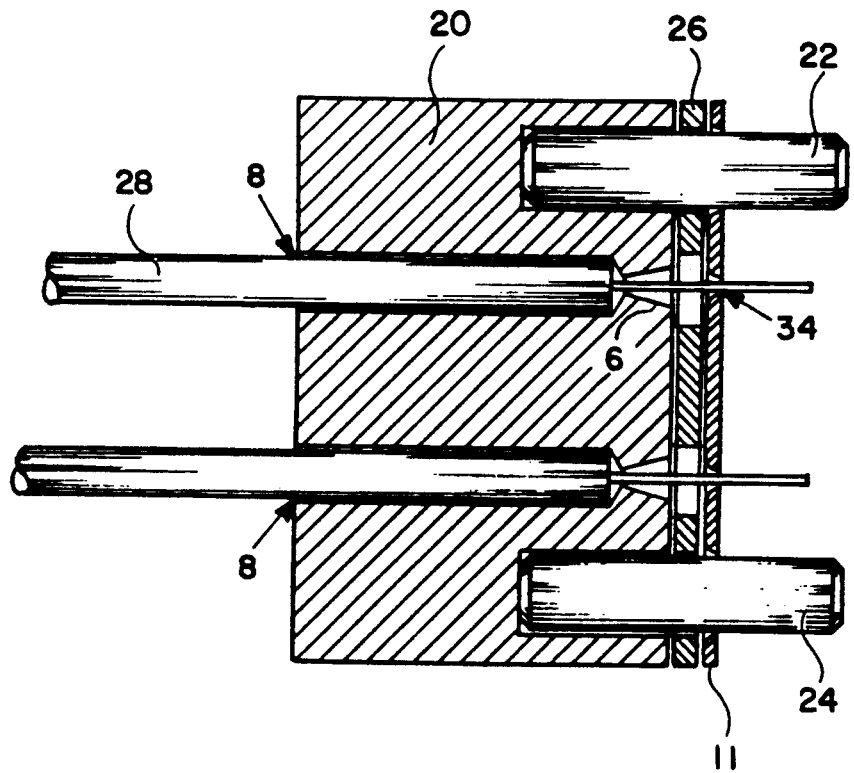
FIG. 3 is a sectional view of an assembly setup in accordance with the present invention.

Referring now to FIG. 3, there is shown an assembly setup for precisely epoxying optical fibers into a precision alignment bushing. Alignment pins 22 and 24 are inserted into their respective holes 12 and 14 of disk 11 and 4 and 10 of alignment bushing 2. Then a spacer disk 26, preferably of a metallic material, is slipped over the alignment pins 22 and 24 and positioned next to the planar face of the alignment bushing 2. Any material suitable for drilling and etching may be employed for the spacer disk 26. The spacer disk has cut-outs for alignment pin holes 4 and 10 of bushing 2 and 12 and 14 of precision alignment disk 11 and cut-outs for optical fiber holes 6 of bushing 2 and 16 of precision alignment disk 11. Then a precision alignment disk 11 is slipped over the alignment pins 22 and 24 and positioned against the spacer 26. Then optical fibers 28 are inserted into the counterbored holes 8. The ends of the optical fibers are stripped of coating or jacket so that the bare glass fibers feed into the EDM-drilled holes 6 in the alignment bushing 2 and the electroformed holes 16 in the precision alignment disk 11. The spacer disk 26 spaces the alignment disk 11 away from the mouths of the holes 6 providing thereby better fiber optic alignment accuracy than that obtained without the spacer disk. Epoxy is introduced into the counterbored holes 8, and drawn under vacuum, imparted by any suitable vacuum means, through the EDM-drilled holes 6 so that an epoxy bead is formed where each optical fiber 28 exits from its hole 6. After the epoxy is cured, the spacer disk 26, alignment pins 22 and 24, and the alignment disk 28, together with the projecting ends of the optical fibers, are removed either by grinding or some other mechanical means exposing the planar top surface of the alignment bushing 2. The face thereof is then polished so that the optical fibers are flush with the surface of the alignment bushing 2. The spacer disk allows any fracture that may occur in the optical fibers to terminate short of the holes 6 during their removal, providing thereby an interface substantially free from fractures of optical fibers.

Figure 5A:
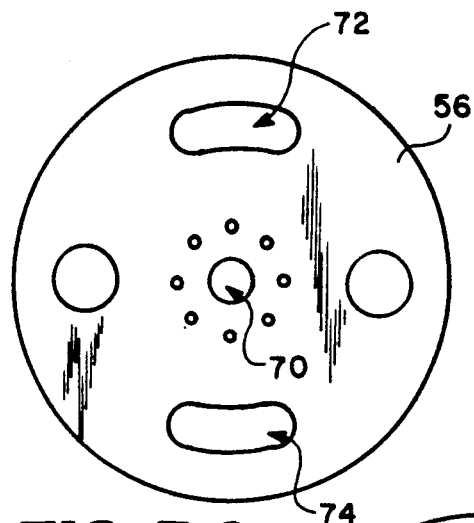
FIG. 5A, FIG. 5B and FIG. 5C are plan views of different components of the FIG. 4 assembly setup.
Figure 5B:
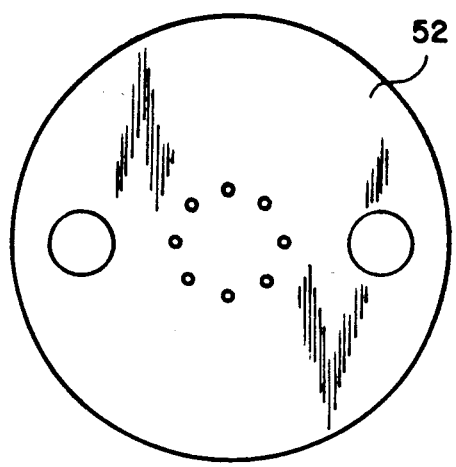
Figure 5C:
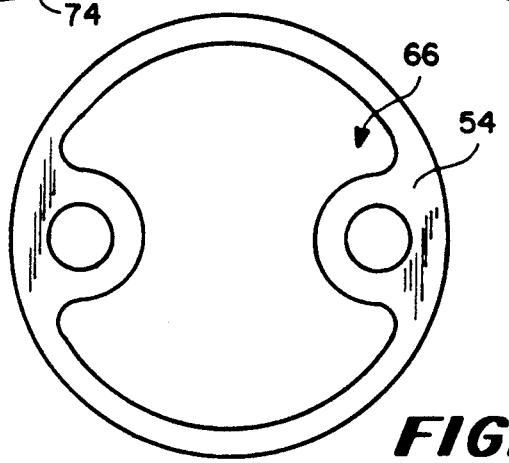
Figure 4:
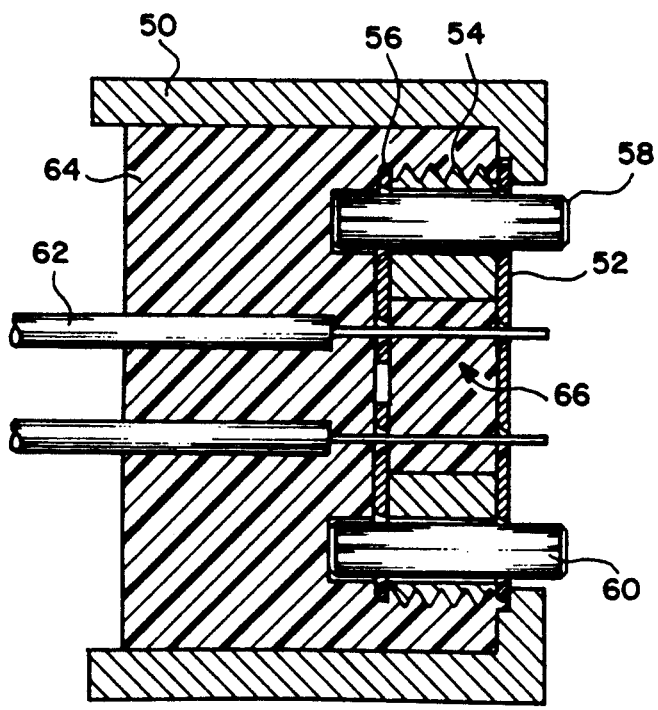
FIG. 4 is a sectional view of an alternative assembly setup in accordance with the present invention.

Referring now to FIG. 4 there is shown an alternative assembly setup to align optical fibers to form a planar fiber optic interface on a precision alignment bushing. A mold housing 50 defines the outside boundary of the precision alignment bushing to be fabricated. On the top of the mold housing 50 is placed a perforated precision electroformed alignment disk 52, an alignment pin receptacle and spacer 54, and a perforated precision electroformed alignment disk 56. The top of the alignment disk 52 is coated with mold release such as a silicon compound. Precision alignment pins 58 and 60 are inserted in the alignment pin holes in the alignment disk 52, in the holes of the alignment pin receptacle 54, and in the holes of the perforated alignment disk 56 and project therethrough, as shown. The portions of the alignment pins 58 and 60 which project beyond the perforated alignment disk 56 are coated with mold release. Fibers 62 are inserted through the aligned openings provided therefor in the members 52, 54, 56. A filled epoxy 64 such as CHOCKFAST ORANGE is poured into the mold housing 50. The filled epoxy passes through the perforated disk 56 which has slots 70, 72 and 74 as shown in FIG. 5A and fills the void 66 in the alignment pin receptacle 54. The outside circumferential wall of the alignment pin receptacle 54 is preferably serrated to facilitate bonding to the epoxy 64. After the epoxy 64 is cured, the mold housing 50, alignment pins 58 and 60, the alignment disk 52, and the extending portions of the optical fibers are removed, either by grinding and polishing or some other mechanical means and the top surface of the molded alignment bushing is optically polished to form a precision planar fiber optic interface.

A modification to the assembly setup shown in FIG. 4 is to replace the alignment pin receptacle 54 by a loose spacer, not shown, and to seat the lower ends of alignment pins 58 and 60 in a precision positioning jig, not shown. Then, when the epoxy 64 is poured into the mould housing 50, the epoxy flows around the alignment pins 58 and 60 in the region above the alignment disk 52. When the pins are removed, the receptacle holes are formed as the negative image of the pins out of epoxy. This reduces assembly cost, since the only precision part in the final molded alignment bushing is the perforated alignment disk, which is mass producable at low cost.

Many other modifications to the presently disclosed invention are possible without departing from the inventive concept.

What is claimed is:

1. A method for producing precisely-located optical fibers at a planar interface and mating a plurality of identical planar interfaces, wherein said method comprises the steps of:

drilling an optical fiber bushing to provide at least a pair of alignment holes for housing a pair of alignment pins in said pair of holes and optical fiber receiving channels in an intended pattern through the optical fiber bushing;

spacing an alignment disk having a pair of holes matching said pair of alignment holes in said optical fiber bushing and an array of holes therein-through that match the intended pattern of the channels of the optical fiber bushing from the optical fiber bushing in such manner that each hole thereof is aligned with but spaced from a corresponding channel;

inserting optical fibers individually into the channels and aligned holes;

using at least a pair of alignment pins for mating said plurality of identical planar interfaces;

surrounding the inserted optical fibers with a setable material;

allowing the setable material to set;

removing the alignment disk and extending optical fibers from the optical fiber bushing and said pair of alignment pins;

polishing a face of the bushing optically flat; and re-inserting said pair of alignment pins for mating said plurality of identical planar interfaces.

2. The method of claim 1, wherein said optical fiber receiving channels have a longitudinal direction, and said drilling step includes the step of providing a stepped geometry to each of said optical fiber receiving channels.

3. The method of claim 2, wherein said drilling step includes the steps of using mechanical drilling to form one portion of said stepped optical fiber receiving channels and using EDM drilling to form the other portion of said stepped optical fiber receiving channels.

4. The method of claim 1, wherein said optical fiber bushing is metallic.

5. The method of claim 1, wherein said spacing step includes the step of placing a spacer against said optical fiber bushing.

6. The method of claim 5, wherein said spacer is a spacer disk.

7. The method of claim 6, wherein said spacer disk is a drillable material.

8. The method of claim 1, wherein said alignment disk is a precision, electroformed alignment disk.

9. A method for producing precisely-located optical fibers at a planar interface and mating a plurality of identical planar interfaces wherein said method comprises the steps of:

spacing apart first and second generally planar members of said planar interface having matching optical fiber receiving hole patterns one outside the other with the holes thereof in aligned relation;

using at least a pair of alignment pins passing through said first and second members of said planar interface;

inserting optical fibers individually through the aligned holes;

surrounding the optical fibers that extend between the generally planar members with a setable material;

allowing the setable material to set;

removing said pair of alignment pins after setting of setable material;

removing the outside one of the generally planar members and any extending parts of the optical fibers;

polishing a face of the setable material optically flat; and re-inserting said pair of alignment pins for mating two adjacent planar interfaces of said plurality of planar interfaces.

10. The method of claim 9, wherein said spacing step includes the steps of inserting a spacer disk with precision holes for alignment pins between the first and second generally planar members.

11. The invention of claim 10, wherein said spacer disk is a drillable and maskable material.

12. The invention of claim 9, wherein said first and second generally planar members are precision electroformed disks.

13. The invention of claim 9, further including the step of providing the first and second planar members with alignment pin receiving openings, and further including the step of inserting alignment pins through the alignment pin openings of the first and second planar members.

14. The invention of claim 13, wherein said removing step includes removing the alignment pins after the setable material is allowed to set.

15. The method of claim 9, further including the steps of positioning alignment pins externally of the setable material in such manner that the alignment pins extend therein, surrounding the alignment pins with the setable material during the surrounding step, and after the setable material has been allowed to set, removing the alignment pins leaving a negative image thereof in the setable material.

16. An optical interface, comprising:

a first generally planar member having optical fiber receiving holes thereinthrough in an intended pattern;

a second generally planar member having optical fiber receiving holes thereinthrough in an intended pattern that matches the intended pattern of the first generally planar member and spaced apart therefrom in such a way that corresponding holes are aligned;

a spacer between the spaced apart first and second generally planar members having an open region therebetween;

a plurality of optical fibers individually received through aligned pairs of holes in said first and second generally planar members that pass through the open region of the spacer;

a setable material in the open region of the spacer surrounding the optical fibers and retaining them securely in an aligned condition therewithin; and at least a pair of alignment pins for mating two identical optical interfaces.

17. The interface of claim 16, wherein said first and second generally planar members are precision electoformed disks.

18. The interface of claim 16, wherein said spacer includes alignment pin receiving openings, wherein said first and second generally planar members include alignment pin receiving openings, and wherein said setable material includes aligment pin receiving recesses.

* * * * *